(12) United States Patent
Kuo

(10) Patent No.: US 11,378,842 B2
(45) Date of Patent: Jul. 5, 2022

(54) BACKLIGHT MODULE AND DISPLAY DEVICE

(71) Applicant: HKC CORPORATION LIMITED, Shenzhen (CN)

(72) Inventor: Chao-Kun Kuo, Chongqing (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/040,047

(22) PCT Filed: Dec. 4, 2018

(86) PCT No.: PCT/CN2018/119063
§ 371 (c)(1),
(2) Date: Sep. 21, 2020

(87) PCT Pub. No.: WO2020/103188
PCT Pub. Date: May 28, 2020

(65) Prior Publication Data
US 2021/0003890 A1    Jan. 7, 2021

(30) Foreign Application Priority Data

Nov. 22, 2018   (CN) .......................... 201821929838.9

(51) Int. Cl.
*G02F 1/13357* (2006.01)

(52) U.S. Cl.
CPC .. *G02F 1/133605* (2013.01); *G02F 1/133608* (2013.01)

(58) Field of Classification Search
CPC ......... G02F 1/133602; G02F 1/133603; G02F 1/133608; G02F 1/133611
See application file for complete search history.

(56) References Cited

U.S. PATENT DOCUMENTS

2016/0273733 A1\*  9/2016  Liu ................... G02F 1/133611

FOREIGN PATENT DOCUMENTS

| CN | 204785868 U | 11/2015 |
|---|---|---|
| CN | 105301839 A | 2/2016 |
| CN | 205229633 U | 5/2016 |
| CN | 106231220 A | 12/2016 |
| CN | 206209242 U | 5/2017 |
| CN | 206990979 U | 2/2018 |

OTHER PUBLICATIONS

Yan Yang, the ISA written comments, Aug. 2019, CN.
Yan Yang, the International Search Report, dated Aug. 2019, CN.

\* cited by examiner

*Primary Examiner* — Karabi Guharay

(57) ABSTRACT

This application discloses a backlight module, including: a back plate, a backlight source installed on the back plate, a luminous region located in the center region of the back plate, and a dark region which is located at the edge of the back plate and surrounds the luminous region. The backlight source includes first light sources and second light sources. The first light sources are located in the luminous region, and the second light sources are located in the dark region.

15 Claims, 3 Drawing Sheets

BACKLIGHT MODULE AND DISPLAY DEVICE

CROSS REFERENCE OF RELATED APPLICATIONS'

This application claims the priority to the Chinese Patent Application No. 201821929838.9, filed with National Intellectual Property Administration, PRC on Nov. 22, 2018 and entitled "BACKLIGHT MODULE AND DISPLAY DEVICE", which is incorporated herein by reference in its entirety.

TECHNICAL FIELD

This application relates to the field of display technologies, and more particularly to a backlight module and a display device.

BACKGROUND

The description herein provides only background information related to this application, but does not necessarily constitute the existing technology. A liquid crystal display (LCD) is widely applied to electronic display equipment such as a computer, a mobile phone, an electronic dictionary and a liquid crystal display television due to the advantages of light weight, thinness, low power consumption, low radiation and so on. Generally, a direct-light type backlight module provides a light source for the liquid crystal display. The direct-light type backlight mode is widely used due to low cost, a simple assembling mode, easy implementation of regional light dimming.

During design of the direct-light type backlight module, as light sources illuminate from a backlight back plate according to arrayed lamp sources from bottom to top and have same distances therebetween and consistent light shapes, a shadow may occur on the corner of the blacklight module because the light sources can't illuminate the corner.

SUMMARY

This application provides a backlight module and a display device to avoiding a shadow occur because lack of light source on corner.

To achieve the above-mentioned objective, this application provides a backlight module, comprising:

a back plate; a backlight source, installed on the back plate; a luminous region, located in the center of the back plate, and a dark region located at the edge of the back plate and surrounding the luminous region.

The backlight source includes a first light source and a second light source. The first light source is located in the luminous region, and the second light source is located in the dark region.

Optionally, the dark region includes a plurality of side edges, and the second light source is arranged on the side edge.

Optionally, the side edges include two parallel and opposite first side edges and two parallel and opposite second side edges. The first side edges are perpendicular to the second side edges.

The first side edges are longer than the second side edges. The second light source is arranged on the second side edge.

Optionally, the dark region includes a plurality of side edges. Two adjacent side edges are connected to form a corner, and the second light source is arranged at the corner.

Optionally, at least two second light sources are arranged at each corner.

Optionally, the backlight source includes a reflection structure. The reflection structure is arranged at the corner region of the back plate. The reflection structures is matched with the corresponding second light source.

Optionally, the reflection structure is a conical reflection structure.

Optionally, the back plate includes: a bottom plate corresponding to the luminous region; a first reflection plate corresponding to the dark region, located on a plane different from the plane of the bottom plate and connected with the first side edge of the bottom plate; and a second reflection plate corresponding to the dark region, located on a plane different from the plane of the bottom plate and connected with the second side edge of the bottom plate. The first reflection plate, the second reflection plate and the bottom plate form the conical reflection structure at an intersection. The first light source is arranged on the bottom plate. The second light source is arranged on an intersection point of the first reflection plate, the second reflection plate and the bottom plate.

This application further discloses a backlight module, comprising:

a back plate and a backlight source. The backlight source includes a first light source and a second light source. The back plate includes a bottom plate located in the center region of the back plate; a first reflection plate located on a plane different from the plane of the bottom plate and connected with the first side edge of the bottom plate; and a second reflection plate located on a plane different from the plane of the bottom plate and connected with the second side edge of the bottom plate.

The first reflection plate, the second reflection plate and the bottom plate form a conical reflection structure at an intersection. The first light source is arranged on the bottom plate. The second light source is arranged on an intersection point of the first reflection plate, the second reflection plate and the bottom plate.

This application further discloses a display device, comprising any one of the above-mentioned backlight modules.

According to this application, by adding the light source in the dark region of the backlight module and further adding a reflection sheet on the added light source, a contrast difference between the brightness of the center position and the brightness of the corner of a direct-light type backlight module, and thus a shadow in the dark region of the direct-light type backlight module is effectively reduced.

BRIEF DESCRIPTION OF DRAWINGS

The accompanying drawings included are used for helping understand the embodiments of this application, constitute a part of this specification, illustrate examples of the embodiments of this application and, together with the description, serve to explain the principles of this application. Apparently, the accompanying drawings in the following description merely show some embodiments of this application, and persons of ordinary skill in the art may still derive other drawings from these accompanying drawings without creative effort. In the figures.

DETAILED DESCRIPTION

Specific structures and functional details disclosed herein are merely representative, and are intended to describe the objectives of the exemplary embodiments of this application. However, this application may be specifically implemented in many alternative forms, and should not be construed as being limited to the embodiments set forth herein.

In the description of this application, it should be understood that orientation or position relationships indicated by the terms such as "center", "transverse", "on", "below", "left", "right", "vertical", "horizontal", "top", "bottom", "inside", and "outside" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of this application. In addition, the terms such as "first" and "second" are used only for the purpose of description, and should not be understood as indicating or implying the relative importance or implicitly specifying the number of the indicated technical features. Therefore, a feature defined by "first" or "second" can explicitly or implicitly include one or more of said features. In the description of this application, unless otherwise stated, "a plurality of" means two or more than two. In addition, the terms "include", "comprise" and any variant thereof are intended to cover non-exclusive inclusion.

In the description of this application, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. Persons of ordinary skill in the art may understand the specific meanings of the foregoing terms in this application according to specific situations.

The terminology used herein is for the purpose of describing specific embodiments only and is not intended to be limiting of exemplary embodiments. As used herein, the singular forms "a", "an" and "the" are intended to include the plural forms as well, unless the context clearly indicates otherwise. It should be further understood that the terms "include" and/or "comprise" when used in this specification, specify the presence of stated features, integers, steps, operations, elements, and/or components, but do not preclude the presence or addition of one or more other features, integers, steps, operations, elements, components, and/or combinations thereof.

Figure 2:
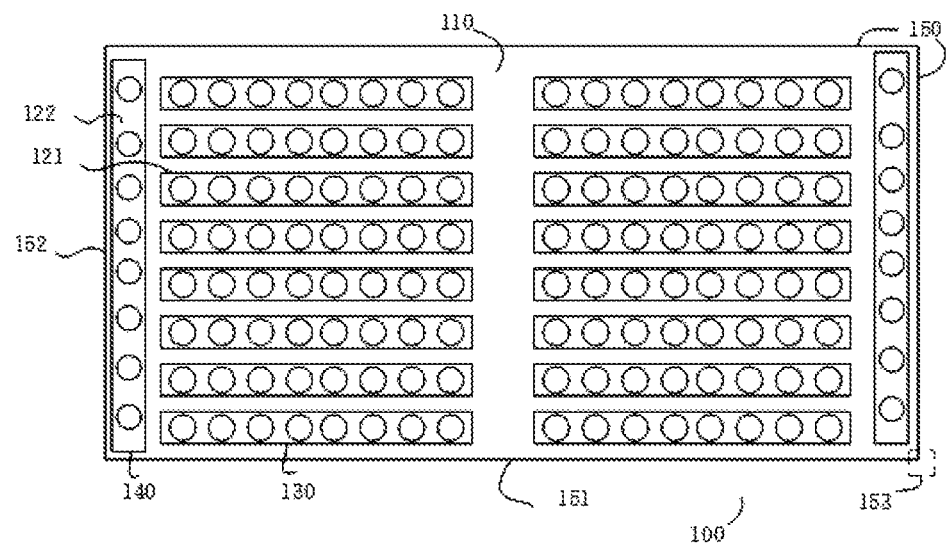
FIG. 2 is a schematic diagram of a backlight module of one embodiment of this application.
Figure 3:
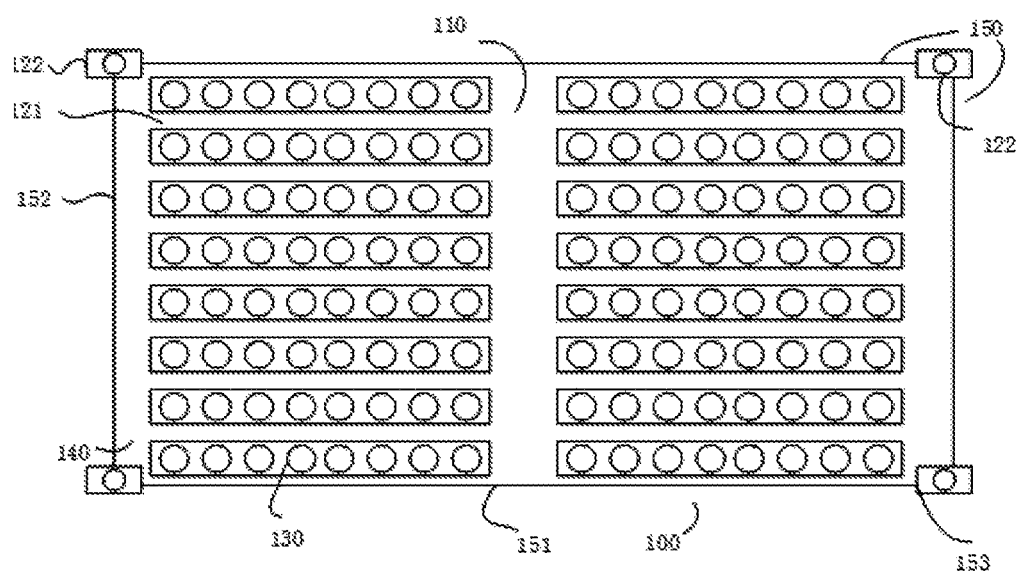
FIG. 3 is a schematic diagram of a backlight module of another embodiment of this application.
Figure 4:
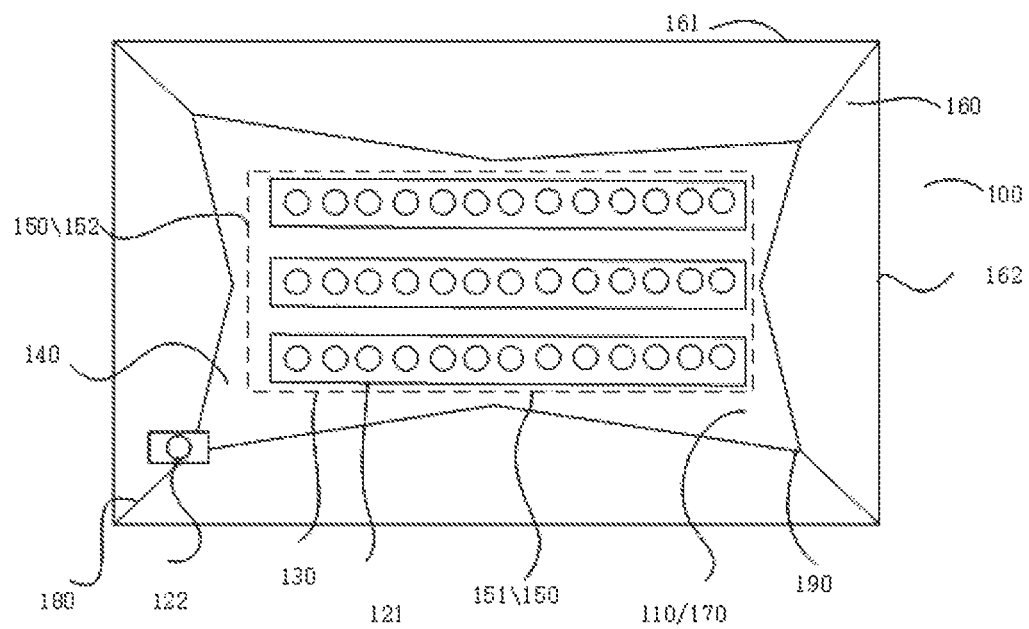
FIG. 4 is a schematic diagram of a backlight module structure of another embodiment of this application.

As shown in FIGS. 2 to 4, the embodiment of this application discloses a backlight module 100, including:

a back plate 110, a backlight source 120 installed on the back plate 110, a luminous region 130 located in the center of the back plate 110, and a dark region 140 which is located at the edge of the back plate 110 and surrounds the luminous region 130.

The backlight source 120 includes first light sources 121 and second light sources 122. The first light sources 121 are located in the luminous region 130, and the second light sources 122 are located in the dark region 140.

Figure 1:
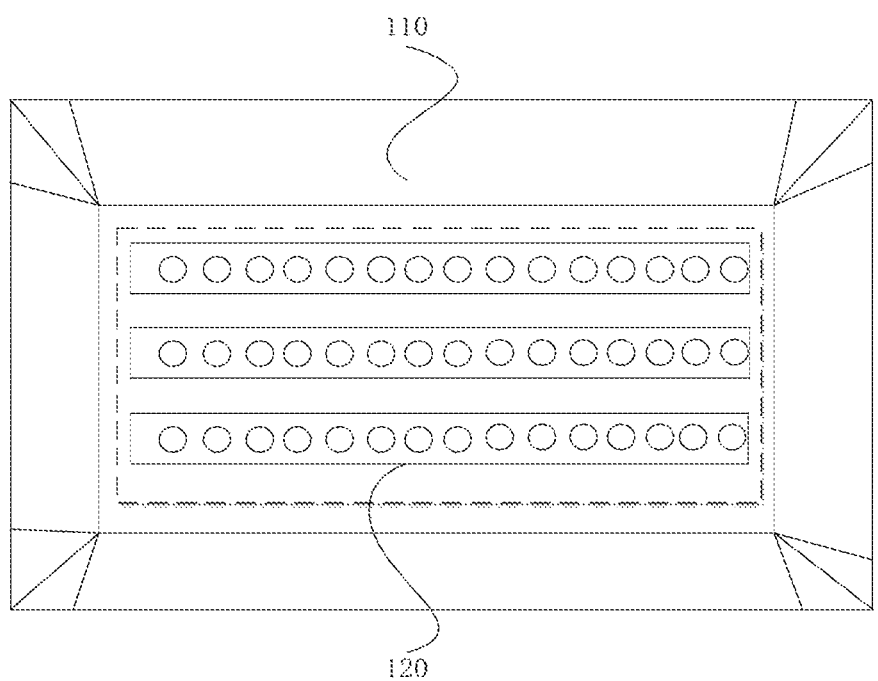
FIG. 1 is a structural schematic diagram of an exemplary backlight module of this application.

Compared with the exemplary backlight module of FIG. 1, this solution has the advantages that by adding the light sources in the dark region 140 of the backlight module 100, a contrast difference between the brightness of the center position and the brightness of a corner of the direct-light type backlight module 100 is reduced, and the shortage of direct-light type vertical light sources at the corner and the edge is overcome.

In one embodiment, the dark region 140 includes a plurality of side edges 150, and the second light sources 122 are arranged on the side edges 150.

In this solution, as long as any side edge 150 of the backlight module 100 has a light source, the problem of shortage of the backlight source 120 at the corner and the edge may be compensated appropriately.

As shown in FIG. 2, in one embodiment, the side edges 150 include two parallel and opposite first side edges 151 and two parallel and opposite second side edges 152. The first side edges 151 are perpendicular to the second side edges 152. The first side edges 151 are longer than the second side edges 152. The second light sources 122 are arranged on the second side edges 152.

In this solution, the backlight source 120 is arranged on the short side of the backlight module 100, so that the light at the corner may be compensated, and the material and the cost of the backlight source 120 are saved. There is no limitation to the material of the backlight source 120 which may be a light emitting diode (LED) lamp, or an LED lamp tube, or a diode luminous tube and the like.

As shown in FIG. 3, in one embodiment, the dark region 140 includes a plurality of side edges 150. Two adjacent side edges 150 are connected to form a corner 153, and the second light sources 122 are arranged at the corner 153.

In this solution, the light sources are added at the corners, so that the corners are illuminated by the light sources to compensate the shortage of light at the corners.

In one embodiment, at least two second light sources 122 are arranged at each corner.

In this solution, the corner spaces are fully used. One more light source is added in a usable space of each corner to enable the corner to be brighter. Each corner 153 has at least two second light sources, so that a difference of the brightness from the center luminous region 130 is reduced easily.

In one embodiment, the backlight source 120 includes reflection structures 160. The reflection structures 160 are arranged at the corner regions of the back plate 110. The reflection structures 160 are matched with the corresponding second light sources 122.

In this solution, the reflection structures 160 are added on the second light sources 122, so that the brightness of the corners on the reflection surfaces of the second light sources 122 is compensated to a larger extent. There is no limitation to reflection sheets here. The reflection sheets may be adhered to form the reflection structures, or the surfaces of three plates are subjected to mirror finish to also achieve an objective of reflecting light rays.

In one embodiment, the reflection structures 160 are conical reflection structures 180.

In this solution, the conical reflection structures 160 focus light more easily. It is known that the reflection structures 160 are required to be arranged at the corners, and that the corners are also provided with the second light sources 122, the conical shapes may gather the light sources at the corners, so that higher brightness and a wider reflection area are achieved to compensate the shortage of vertical light sources at the corners.

As shown in FIG. 4, in one embodiment, the back plate 110 includes: a bottom plate 170 corresponding to the luminous region 130; first reflection plates 161 which correspond to the dark region 140, are located on a plane different from the plane of the bottom plate 170 and are connected with the first side edges 151 of the bottom plate 170; and second reflection plates 162 which correspond to the dark region 140, are located on a plane different from the plane of the bottom plate 170 and are connected with the second side edges 152 of the bottom plate 170. The first reflection plates 161, the second reflection plates 162 and the bottom plate 170 form the conical reflection structures 160 at intersections. The first light sources 121 are arranged on the bottom plate 170. The second light sources 122 are arranged on intersection points 190 of the first reflection plates 161, the second reflection plates 162 and the bottom plate 170.

In this solution, as shown in FIG. 4, the first reflection plates 161, second reflection sheets and the bottom plate 170 are connected to form an irregular planar intersection plane to form a conical reflection plane, and the second light sources 122 are arranged at the vertex of the conical reflection plane to focus light more easily and improve the brightness of the corners conveniently. The reflection area at the vertex of the conical shape is the larger so as to reflect the light sources of the corners to the larger extent to compensate corner shadows caused by the vertical light sources of the direct-light type backlight module 100.

As shown in FIG. 4, another embodiment of this application discloses a backlight module 100, including:

a back plate 110 and a backlight source 120. The backlight source 120 includes first light sources 121 and second light sources 122. The back plate 110 includes a bottom plate 170 located in the center region of the back plate; first reflection plates 161 which are located on a plane different from the plane of the bottom plate 170 and are connected with the first side edges 151 of the bottom plate 170; and second reflection plates 162 which are located on a plane different from the plane of the bottom plate and are connected with the second side edges 152 of the bottom plate 170.

The first reflection plates 161, the second reflection plate 162 and the bottom plate 170 form conical reflection structures 160 at intersections. The first light sources 121 are arranged on the bottom plate 170. The second light sources 122 are arranged on intersection points 190 of the first reflection plates 161, the second reflection plates 162 and the bottom plate 170.

Figure 5:
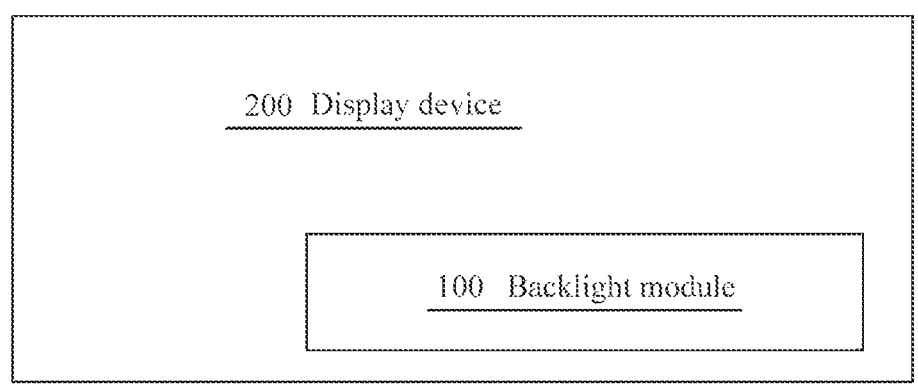
FIG. 5 is a schematic diagram of a display device of one embodiment of this application.

As shown in FIG. 5, another embodiment of this application discloses a display device 200, including any one of the above-mentioned backlight modules 100.

The technical solutions of this application can be widely applied to various display panels, such as twisted nematic (TN) panels, in-plane switching (IPS) panels, vertical alignment (VA) panels, and multi-domain vertical alignment (MVA) panels. Certainly, other types of display panels such as organic light-emitting diode (OLED) display panels are also applicable to the above solutions.

The foregoing contents are detailed descriptions of this application in conjunction with specific embodiments, and it should not be considered that the specific implementation of this application is limited to these descriptions. Persons of ordinary skill in the art can further make simple deductions or replacements without departing from the concept of this application, and such deductions or replacements should all be considered as falling within the protection scope of this application.

What is claimed is:

1. A backlight module, comprising:
   a back plate;
   a backlight source, installed on the back plate;
   a luminous region, located in the center region of the back plate; and
   a dark region, located at the edge of the back plate and surrounding the luminous region, wherein
   the backlight source comprises a first light source and a second light source; and
   the first light source is located in the luminous region, and the second light source is located in the dark region;
   wherein the first light source comprises a plurality of horizontal LED light bars that are vertically aligned, and each horizontal LED light bar comprises a plurality of LEDs, and wherein the second light source comprises at least one vertical LED light bar, each of which comprises a plurality of LEDs;
   wherein the dark region comprises a plurality of side edges, and the second light source is arranged on an inner wall of the side edges;
   wherein the side edges comprise: two first side edges, arranged in parallel and oppositely; and
   two second side edges, arranged in parallel and oppositely, and perpendicular to the first side edges; and
   the first side edges are longer than the second side edges, and the second light source is only arranged on the second side edges, and wherein the first side edges are not provided with the second light source.

2. A display device, comprising the backlight module according to claim 1.

3. The backlight module according to claim 1, wherein the plurality of horizontal LED light bars are arranged into two columns, one column comprises the same number of horizontal LED light bars as that of another column, wherein the horizontal LED light bars within each column are vertically aligned, and are further horizontally aligned with the horizontal LED light bars of another column.

4. The backlight module according to claim 1, wherein each of the plurality of horizontal LED light bars comprises eight LEDs, and wherein each of the at least one vertical LED light bar comprises eight LEDs.

5. A backlight module, comprising:
   a back plate;
   a backlight source, installed on the back plate;
   a luminous region, located in the center region of the back plate; and
   a dark region, located at the edge of the back plate and surrounding the luminous region, wherein
   the backlight source comprises a first light source and a second light source; and
   the first light source is located in the luminous region, and the second light source is located in the dark region, wherein the dark region comprises a plurality of side edges; two adjacent side edges are connected to form a corner; and the second light source is arranged in the corner regions, and wherein the second light source is only arranged in the corner regions of the dark region and not arranged in the remaining portions of the dark region.

6. The backlight module according to claim 5, wherein at least two second light sources are arranged at each corner.

7. The backlight module according to claim 5, wherein the backlight module comprises a reflection structure; the reflection structure is arranged in the dark region of the back plate; and the reflection structure is matched with the corresponding second light source, wherein the reflection structure is disposed under the corresponding second light source.

8. The backlight module according to claim 7, wherein the reflection structure is in the shape of a tetrahedron.

9. The backlight module according to claim 8, wherein the back plate comprises:
   a bottom plate, corresponding to the luminous region;
   a first reflection plate, corresponding to the dark region, located on a plane different from the plane of the bottom plate and connected with the first side edge of the bottom plate; and
   a second reflection plate, corresponding to the dark region, located on a plane different from the plane of the bottom plate and connected with the second side edge of the bottom plate;
   the first reflection plate, the second reflection plate and the bottom plate form the tetrahedron-shaped reflection structure at an intersection;
   the first light source is arranged on the bottom plate; and
   the second light source is arranged on an intersection point of the first reflection plate, the second reflection plate and the bottom plate.

10. A display device comprising the backlight module according to claim 5.

11. The display device according to claim 10, wherein at least two second light sources are arranged at each corner.

12. The display device according to claim 10, wherein the backlight module comprises a reflection structure; the reflection structure is arranged in the dark region of the back plate; and the reflection structure is matched with the corresponding second light source, wherein the reflection structure is disposed under the corresponding second light source.

13. The display device according to claim 12, wherein the reflection structure is in the shape of a tetrahedron.

14. The display device according to claim 13, wherein the back plate comprises:
   a bottom plate, corresponding to the luminous region;
   a first reflection plate, corresponding to the dark region, located on a plane different from the plane of the bottom plate and connected with the first side edge of the bottom plate; and
   a second reflection plate, corresponding to the dark region, located on a plane different from the plane of the bottom plate and connected with the second side edge of the bottom plate;
   the first reflection plate, the second reflection plate and the bottom plate form the tetrahedron-shaped reflection structure at an intersection;
   the first light source is arranged on the bottom plate; and
   the second light source is arranged on an intersection point of the first reflection plate, the second reflection plate and the bottom plate.

15. A backlight module, comprising:
   a back plate;
   a backlight source, comprising a first light source and a second light source;
   the back plate comprises:
   a bottom plate, located in the center region of the back plate;
   a first reflection plate, located on a plane different from the plane of the bottom plate and connected with the first side edge of the bottom plate; and
   a second reflection plate, located on a plane different from the plane of the bottom plate and connected with the second side edge of the bottom plate;
   the first reflection plate, the second reflection plate and the bottom plate form a tetrahedron-shaped reflection structure at an intersection;
   the first light source is arranged on the bottom plate; and
   the second light source is arranged on an intersection point of the first reflection plate, the second reflection plate and the bottom plate.

\* \* \* \* \*